US009346329B2

(12) United States Patent
Keane

(10) Patent No.: US 9,346,329 B2
(45) Date of Patent: May 24, 2016

(54) TIRE INFLATION SYSTEM AND METHOD OF CONTROL

(71) Applicant: ArvinMeritor Technology, LLC, Troy, MI (US)

(72) Inventor: James Keane, West Bloomfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 204 days.

(21) Appl. No.: 14/080,941

(22) Filed: Nov. 15, 2013

(65) Prior Publication Data

US 2015/0136270 A1 May 21, 2015

(51) Int. Cl.
*B60C 23/00* (2006.01)

(52) U.S. Cl.
CPC ......... *B60C 23/003* (2013.01); *Y10T 137/0396* (2015.04)

(58) Field of Classification Search
CPC .... B60C 23/00; B60C 23/001; B60C 23/003; B60C 23/004; B60C 23/10; B60C 23/16; B60C 29/00
USPC .......................................... 152/415, 416, 417
See application file for complete search history.

(56) References Cited

U.S. PATENT DOCUMENTS 5,141,589 A * 8/1992 Mittal ........................... 152/415
5,180,456 A 1/1993 Schultz et al.
6,113,012 A * 9/2000 Wear et al. ................. 239/533.9
6,994,136 B2 2/2006 Stanczak
RE41,756 E 9/2010 Claussen et al.
7,931,061 B2 4/2011 Gonska et al.
2004/0055291 A1 3/2004 Meydieu et al.
2012/0186714 A1 7/2012 Richardson
2012/0234447 A1 9/2012 Narloch et al.

FOREIGN PATENT DOCUMENTS

DE 2826635 A1 1/1980
DE 2826635 A1 * 1/1980 ............. B60C 23/02

OTHER PUBLICATIONS

Meritor an ArvinMeritor brand, Meritor Tire Inflation System (MTIS) by PSI (TM), including Meritor ThermALERT (TM), PB-9999, revised May 2007.
European Patent Office, European Search Report for the corresponding European Patent Application No. EP 14 18 4855 mailed Jan. 27, 2015.

* cited by examiner

*Primary Examiner* — John Walters
*Assistant Examiner* — James Triggs
(74) *Attorney, Agent, or Firm* — Brooks Kushman P.C.

(57) ABSTRACT

A tire inflation system and a method of control. The tire inflation system may include a damped valve that moves from a closed position to an open position faster than from the open position to the closed position.

20 Claims, 2 Drawing Sheets

10
20
22
24
12
28
40
26
28
44
34
52
46
50
48
36
32
30
42
44
40
22
28
12
26
20

TIRE INFLATION SYSTEM AND METHOD OF CONTROL

TECHNICAL FIELD

This patent application relates to a tire inflation system and a method of control.

BACKGROUND

A tire pressure monitoring method is disclosed in U.S. Reissue Pat. No. RE41,756.

SUMMARY

In at least one embodiment, a method of controlling a tire inflation system is provided. The method may include providing a pulse of a pressurized gas to actuate a damped valve from a closed position to an open position. Pressurized gas may be exhausted from the tire before the damped valve moves to the closed position. The damped valve may move from the closed position to the open position faster than the damped valve moves from the open position to the closed position.

In at least one embodiment, a tire inflation system may be provided. The tire inflation system may include a pressurized gas source and a damped valve. The pressurized gas source may be fluidly connected to a tire and may supply a pressurized gas. The damped valve may be disposed between the tire and the pressurized gas source. The damped valve may move between a closed position and an open position. Pressurized gas maybe inhibited from flowing through the damped valve when the damped valve is in the closed position. Pressurized gas may not be inhibited from flowing through the damped valve when the damped valve is in the open position. The damped valve may move from the closed position to the open position faster than the damped valve moves from the open position to the closed position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting but merely as a representative basis for teaching one skilled in the art to variously employ the present invention.

Figure 1:
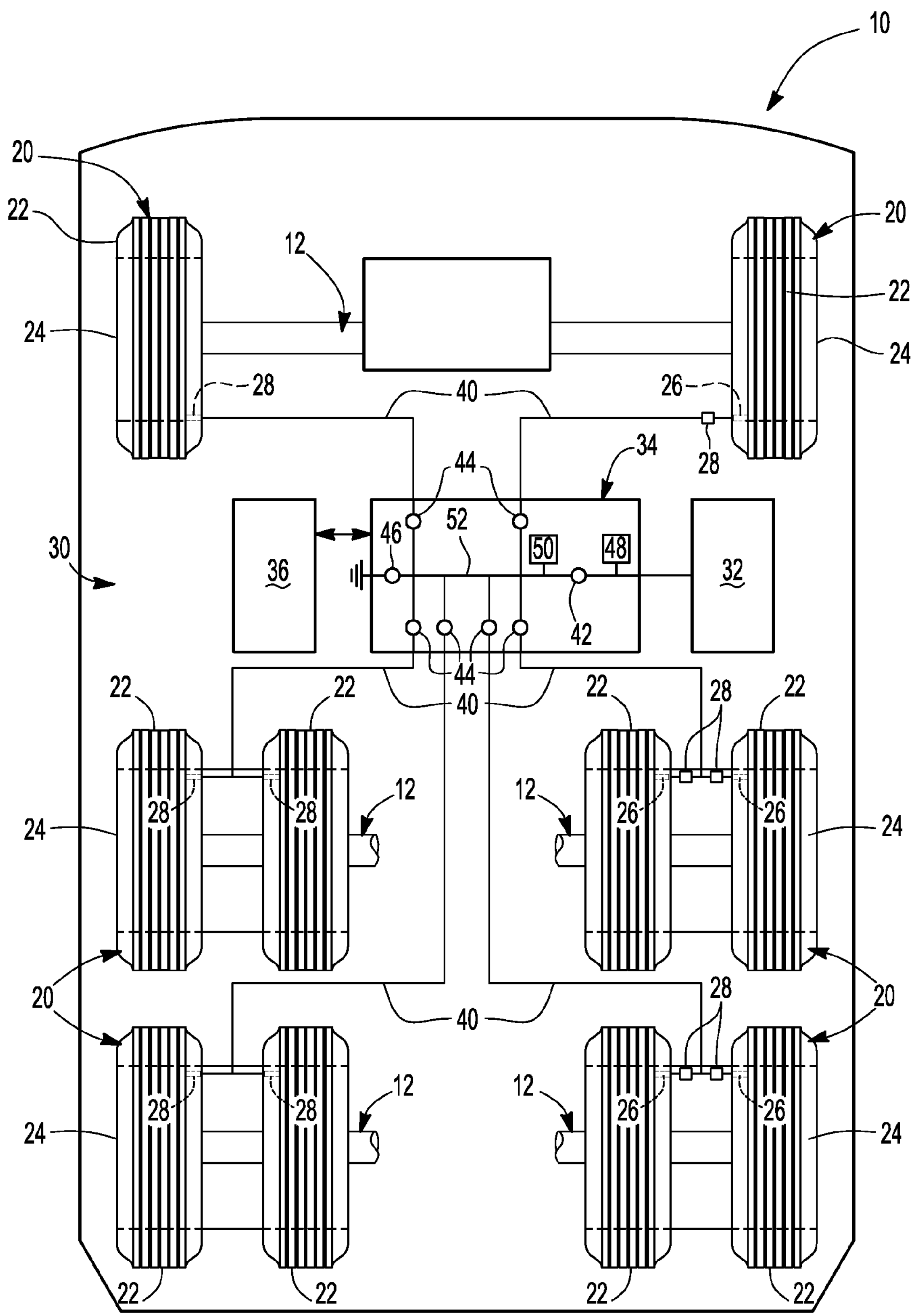
FIG. 1 is a schematic of an exemplary vehicle having a tire inflation system.

Referring to FIG. 1, an exemplary vehicle 10 is shown. The vehicle 10 may be of any suitable type, such as a motor vehicle like a truck, bus, farm equipment, military transport or weaponry vehicle, or cargo loading equipment for land, air, marine vessels, or a trailer that may be provided with a motor vehicle.

The vehicle 10 may include a plurality of axles or axle assemblies 12 that may support and facilitate rotation of at least one wheel assembly 20. Only fragmentary portions of the axle assemblies 12 that are disposed near the bottom of FIG. 1 are shown for clarity. An axle assembly 12 may or may not be configured as a drive axle that provides torque to at least one associated wheel assembly. In addition, an axle assembly 12 may or may not be configured to steer the vehicle 10. Moreover, an axle assembly 12 may be configured as or may include a steering knuckle assembly in a non-drive axle configuration.

Each wheel assembly 20 may include at least one inflatable tire 22 that may be mounted on an associated wheel 24. Each tire 22 may have a tire valve 26 that may facilitate inflation and/or deflation of the tire 22. A tire valve 26, if provided, may extend through a hole in an associated wheel 24 and may be configured to provide gas to a chamber that may be disposed between or may be at least partially defined by the tire 22 and the wheel 24. In FIG. 1, the tire valve locations are generalized for illustration purposes and are not intended to be limiting. The tire valve 26 may be of any suitable type, such as a Schrader valve that may have a valve stem that may be depressed to open the valve and may be released to close a valve. Such valves may not be damped and may open and close at the same rate. Moreover, a tire valve 26 may be held in an open position to permit pressurized gas to pass through the tire valve 26 when connected to a tire inflation system. For example, the valve stem of the tire valve 26 may be mechanically depressed by a rod or similar component that may be disposed in a conduit such as a hose, tube or the like that may provide pressurized gas to the tire valve 26. As such, the tire valve 26 may be normally open when installed on the vehicle 10 and fluidly connected to a tire inflation system and may be normally closed when disconnected from the tire inflation system in one or more embodiments.

A damped valve 28 may replace or may be used in conjunction with the tire valve 26. For illustration purposes, a damped valve 28 is associated with each wheel assembly 20 in FIG. 1, but the wheel assemblies 20 shown on the left side of FIG. 1 are shown without a tire valve 26 while the wheel assemblies 20 shown on the right side of FIG. 1 are shown with a tire valve 26. As shown with reference to the left side of FIG. 1, no valve may be disposed between the damped valve 28 and the tire 22 when a tire valve 26 is not provided. The tire valve 26, if provided, may be fluidly connected to and disposed between the tire 22 and the damped valve 28. As such, the damped valve 28 may be disposed between the tire valve 26 and a pressurized gas source. Moreover, pressurized gas may be permitted to pass through the tire valve 26 independent of the position of the damped valve 28 when the tire valve 26 is held open. The damped valve 28 may be fluidly connected to the tire 22 and facilitate inflation and/or deflation of and associated tire 22 and tire pressure checks as will be discussed in more detail below.

The damped valve 28 may move between an open position and a closed position. The damped valve 28 may move to the open position in response to force exerted by pressurized gas or a pulse of pressurized gas. More specifically, the damped valve 28 may move to the open position when pressurized gas is supplied to the damped valve 28 under sufficient pressure, such as a pressure that is greater than the pressure inside the tire 22. The damped valve 28 may move to the closed position when the pressurized gas is no longer supplied to the damped valve 28 under sufficient pressure. The damped valve 28 may move between the open position and the closed position at different rates or different speeds. For instance, the damped valve 28 may move from the closed position to the open position at a faster speed or faster rate than the damped valve may move from the open position to the closed position. As an example, the damped valve 28 may take about 250 ms to move from the closed position to the open position and make take about 500 ms to move from the open position to the closed position; however, it is contemplated that other opening and closing times may be provided. As such, the damped valve 28 may open faster than it closes, which may inhibit overinflation or facilitate controlled deflation of the tire 22 as will be discussed in more detail below.

The damped valve 28 may have any suitable configuration that may dampen or slow the rate or speed that the damped valve 28 moves from the open position to the closed position. For example, the damped valve 28 may include springs having different spring constants, different frictional drag or hysteresis delay when moving from the open and closed positions, or a valve geometry that dampens movement of the damped valve 28 to the closed position as compared to movement of the valve to the open position.

The vehicle 10 may include a tire inflation system 30 that may be configured to inflate, deflate, and/or check the pressure of one or more tires 22. More specifically, the tire inflation system 30 may be configured to provide a pressurized gas or pressurized gas mixture to one or more tires 22 via a corresponding damped valve 28. For clarity, the term "pressurized gas" may refer to a pressurized gas or a pressurized gas mixture in this application. The tire inflation system 30 may include a pressurized gas source 32, a gas supply subsystem 34, and a control system 36.

The pressurized gas source 32 may be configured to supply and/or store a volume of a pressurized gas or pressurized gas mixture, such as air and/or nitrogen. For example, the pressurized gas source 32 may include a tank and/or a pump like a compressor that may be driven by a vehicle engine or vehicle power source. The pressurized gas source 32 may be disposed on the vehicle 10 and may be configured to provide a pressurized gas or pressurized gas mixture at a pressure that is greater than or equal to a target tire pressure or a target inflation pressure of a tire 22. Each tire 22 may or may not have the same target tire pressure in one or more embodiments.

The gas supply subsystem 34 may fluidly connect the pressurized gas source 32 to one or more tires 22. The gas supply subsystem 34 may include one or more conduits 40, such as a hose, tubing, pipe, or combinations thereof, which may provide pressurized gas to at least one tire 22 via a corresponding damped valve 28 and tire valve 26 if provided. The conduit configuration in FIG. 1 is merely exemplary. For instance, a single conduit 40 may be associated with each tire 22 rather than multiple tires as is shown in the bottom half of FIG. 1. In at least one embodiment, the gas supply subsystem 34 may include an inlet valve 42, at least one outlet valve 44, an exhaust valve 46, a first pressure sensor 48, and a second pressure sensor 50.

The inlet valve 42 may enable or disable the flow of pressurized gas from an outlet of the pressurized gas source 32 to at least one outlet valve 44. Operation of the inlet valve 42 may be controlled by the control system 36. For instance, the inlet valve 42 may include or may be controlled by an actuator, such as solenoid, that may actuate the inlet valve 42 between an open position and a closed position. In the open position, pressurized gas may flow from the pressurized gas source 32 to a manifold 52. The manifold 52 may distribute pressurized gas to multiple conduits 40 and may be disposed between the inlet valve 42 and one or more outlet valves 44. In the closed position, pressurized gas may be inhibited from flowing from the pressurized gas source 32 to the manifold 52. In at least one embodiment, the inlet valve 42 may be normally closed under predetermined operating conditions, such as when the vehicle 10 is not operational or turned off or when the vehicle engine is not running. As such, the inlet valve 42 may inhibit depressurization of the pressurized gas source 32 in the event of a downstream leak.

The outlet valve 44 may enable or disable the flow of pressurized gas from the manifold 52 to a tire 22 or damped valve 28. In FIG. 1, six outlet valves 44 are shown, although it is contemplated that a greater or lesser number of outlet valves 44 may be provided. Each outlet valve 44 may be associated with a different tire 22 and a different conduit 40. Moreover, each outlet valve 44 may be actuated independently of the inlet valve 42 and independently of each other. As such, the inflation and pressure assessment of different tires 22 or sets of tires 22 may be independently controlled.

Operation of the outlet valve 44 may be controlled by the control system 36. For instance, the outlet valve 44 may include or may be controlled by an actuator, such as solenoid, that may actuate the outlet valve 44 between an open position and a closed position. In the open position, pressurized gas may flow from the manifold 52 to at least one corresponding damped valve 28. In the closed position, pressurized gas may be inhibited from flowing from the manifold 52 to at least one corresponding damped valve 28. As such, pressurized gas may not be constantly provided to one or more tires 22, which may facilitate the use of pressure pulses to determine tire pressure as will be discussed in more detail below. In at least one embodiment, the outlet valve 44 may be normally closed under predetermined operating conditions, such as when the vehicle 10 is not operational or turned off or when the vehicle engine is not running.

One or more exhaust valves 46 may facilitate venting of pressurized gas from a tire 22 and an associated conduit 40 to the atmosphere or surrounding environment. In FIG. 1, one exhaust valve 46 is shown that is fluidly connected to the manifold 52, although it is contemplated that a greater number of exhaust valves 46 may be provided, such as by providing exhaust valves 46 that are associated with different tires 22 or different conduits 40. For example, such exhaust valves 46 may be provided between a tire 22 and an outlet valve 44 or between an outlet valve 44 and the manifold 52. In addition, the exhaust valve 46 or exhaust valve functionality may be provided with an outlet valve 44. Thus, the exhaust valve 46 may be part of the outlet valve 44 in one or more embodiments. In the configuration shown in FIG. 1, pressurized gas may pass through an associated damped valve 28 and outlet valve 44 before being exhausted to the atmosphere through the exhaust valve 46. The exhaust valve 46 may be actuated independently of the inlet valve 42 and/or an outlet valve 44. Moreover, in a configuration having multiple exhaust valves, the exhaust valves 46 may be actuated independently of each other. As such, the inflation, deflation and pressure assessment of different tires 22 or sets of tires 22 may be independently controlled.

Operation of the exhaust valve 46 may be controlled by the control system 36. For instance, the exhaust valve 46 may include or may be controlled by an actuator, such as solenoid, that may actuate the exhaust valve 46 between an open position and a closed position. In the open position, pressurized gas may flow from a tire 22, damped valve 28, and/or associated conduit 40 to the atmosphere. In the closed position, pressurized gas may be inhibited from venting from a tire 22 or associated conduit 40 to the atmosphere. Moreover, the exhaust valve 46 may be closed when pressurized gas is provided to inflate a tire 22 or a pressurized gas pulse is provided to open the damped valve 28. In at least one embodiment, the exhaust valve 46 may be normally closed under predetermined operating conditions, such as when the vehicle 10 is not operational or turned off or when the vehicle engine is not running.

The first pressure sensor 48 may be configured to detect the pressure of the pressurized gas provided by the pressurized gas source 32. The first pressure sensor 48 may be of any suitable type and may be fluidly connected to the pressurized gas source 32. For example, the first pressure sensor 48 may be fluidly connected to the pressurized gas source 32 between the pressurized gas source 32 and the inlet valve 42.

The second pressure sensor 50 may be configured to detect the pressure of the pressurized gas provided to a tire 22 or damped valve 28. The second pressure sensor 50 may be of any suitable type and may be disposed between the inlet valve 42 and the tire 22 and may be fluidly connected to the manifold 52. As such, the second pressure sensor 50 may be isolated from the pressurized gas source 32 by closing the inlet valve 42. In at least one embodiment, the second pressure sensor 50 may be disposed between the inlet valve 42 and one or more outlet valves 44 so that the second pressure sensor 50 may be used to detect the pressure of pressurized gas supplied to different tires. Alternatively, multiple second pressure sensors 50 may be provided that may detect the pressure supplied to a particular conduit 40 or particular tire 22.

Optionally, a tire pressure sensor that may be disposed inside the tire 22 or inside a tire chamber that receives the pressurized gas. Such a tire pressure sensor may provide a signal or data that is indicative of the inflation pressure of the tire to the control system 36. The tire pressure sensor may wirelessly communicate with the control system 36 in one or more embodiments.

The control system 36 may monitor and control operation of the tire inflation system 30. The control system 36 may include one or more electronic controllers or control modules programmed to monitor and/or control various components of the tire inflation system 30. For example, the control system 36 may be configured to control actuation of the inlet valve 42, the outlet valve 44 and the exhaust valve 46 to control the flow of pressurized gas. In addition, the control system 36 may be configured to receive data from the first pressure sensor 48 and the second pressure sensor 50 that may be indicative of pressure. In FIG. 1, communication between the control system 36 and these components is represented by the double arrowed line that is located adjacent to the control system 36.

Figure 2:
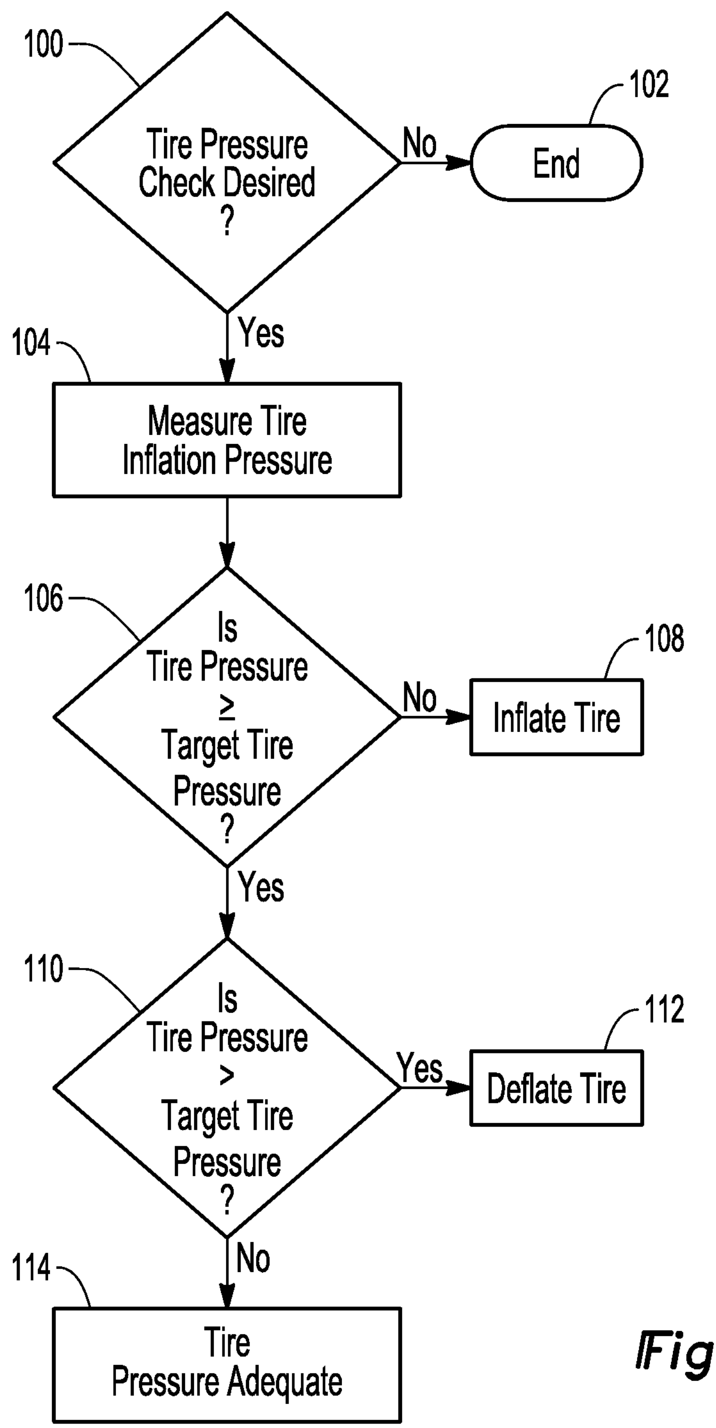
FIG. 2 is a flowchart of an exemplary method of control of the tire inflation system.

Referring to FIG. 2, a flowchart of an exemplary method of control of the tire inflation system is shown. As will be appreciated by one of ordinary skill in the art, the flowchart represents control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope intended.

In at least one embodiment, the method may be executed by the control system 36 and may be implemented as a closed loop control system. Moreover, the method may be enabled or disabled based on the operating state of the vehicle 10. For example, the method or control logic may be enabled when the vehicle ignition is turned on, when the engine is running, or when the vehicle is in motion in one or more embodiments. In addition, the method may be manually activated.

The method will be primarily described in the context of inflating, deflating, and/or evaluating the pressure of a single tire, but it is to be understood that the method may be applied to evaluate and/or adjust the pressure of multiple tires or sets of tires.

As an overview, tire pressure may be determined by opening a tire valve with a pulse of pressurized gas and then measuring the pressure upstream or in a supply conduit. The pressurized gas pulse forces an additional volume of pressurized gas into the tire, thereby increasing the tire pressure. The cumulative effect of multiple pressure pulses may result in overinflation of the tire. Such tire overinflation may be exasperated in a system that checks tire pressure frequently, such as during every vehicle ignition cycle (e.g., each time the vehicle is turned on). For instance, use of such a system in a vehicle that undergoes frequent stops and/or frequent vehicle ignition cycles (e.g., a delivery truck or cargo loading equipment) may result in frequent tire pressure checks and oversample the tire pressure, which may cause tire overinflation, increase pressurization and wear of associated seals, and increase the demand for pressurized gas from a pressurized gas source. A damped valve may mitigate such effects and allow a tire pressure system to be configured to deflate as well as inflate a tire.

At block 100, the method may determine whether a tire pressure check or tire pressure sampling is desired. Tire pressure sampling or sampling of the inflation pressure of a tire may be desired when a tire pressure sampling interval has elapsed. A tire pressure sampling interval may be a constant or variable amount. The tire pressure sampling interval may be expressed in terms of time elapsed and/or distance traveled. If a tire pressure check or tire pressure sampling is not desired, then the method or method iteration may end at block 102 without checking or sampling the tire pressure. If a tire pressure check is desired, the method may continue to block 104.

At block 104, the tire inflation pressure may be measured or checked. Tire pressure may be checked or sampled in various ways depending on the configuration of the tire inflation system. For example, tire pressure may be directly detected or measured with a tire pressure sensor that may be disposed inside the tire or inside a tire chamber that receives a pressure pulse from a pressurized gas source. Such a tire pressure sensor may wirelessly transmit tire pressure data to the control system 36.

Tire pressure may also be directly detected with a pressure sensor that is disposed outside the tire. For example, tire pressure may be detected or measured by actuating or opening the damped valve 28 with a pressurized gas pulse and detecting pressure of a feedback pulse with the second pressure sensor 50.

An example of a sequence of steps for providing a pressure pulse is as follows. First, the inlet valve 42 and the outlet valve 44 may be opened to allow pressurized gas to flow from the pressurized gas source 32 to a damped valve 28. The exhaust valve 46 may be closed so that the pressurized gas is routed to the damped valve 28 and not exhausted to the atmosphere. The inlet valve 42 and the outlet valve 44 may open at approximately the same time. Alternatively, the outlet valve 44 may open before the inlet valve 42 to inhibit potential damage to the outlet valve 44 or other hardware. The inlet valve 42 and the outlet valve 44 may both remain open for a pressurized gas pulse duration time which may be a fixed or variable amount. Next, the inlet valve 42 may be closed when the current pressurized gas pulse duration time has elapsed to terminate the flow of pressurized gas from the pressurized gas source 32 to the damped valve 28 and ends the pressurized gas pulse. Then, a delay may be executed to allow the pressure between the inlet valve 42 and the tire valve 26 to stabilize to improve the accuracy of the pressure reading that may be obtained with the second pressure sensor 50. Next, the tire inflation pressure may be measured or detected with a sensor, such as the second pressure sensor 50. As such, the tire inflation pressure may be measured with a pressure sensor that is disposed outside of the tire 22 and may be measured after opening the damped valve 28 but before opening the exhaust valve 46 or while the exhaust valve 46 is closed. Then, the exhaust valve 46 may be opened to allow pressurized gas to vent from the tire 22 and the associated conduit 40. Opening of the exhaust valve 46 while the inlet valve 42 is closed may exhaust pressurized gas from the tire 22 before the damped valve moves to the closed position. Since the damped valve 28 closes slower than it opens, the damped valve 28 and exhaust valve may be cooperatively used to deflate a tire as will be discussed in more detail below. Finally, the exhaust valve 46 may be closed after the damped valve 28 moves to the closed position.

At block 106, the measured or detected tire pressure may be compared to a target tire pressure. The target tire pressure may be indicative of a desired tire pressure and may account for design tolerances of the tire valve, such as the tolerance range associated with opening the tire valve. The target tire pressure may be a predetermined value or predetermined pressure range that may be based on the make and model of the tire and/or vehicle development testing. If the measured tire pressure is less than the target tire pressure (i.e., not greater than or equal to the target tire pressure or less than the smallest value of a target tire pressure range), then the tire may be underinflated and the tire method may continue at block 108. If the measured tire pressure is not less than target tire pressure, then the method may continue at block 110.

At block 108, the tire may be inflated by providing pressurized gas from the pressurized gas source 32 to the tire 22 by opening the inlet valve 42 and the outlet valve 44 associated with the tire 22. Sufficient force exerted by the pressurized gas may open the damped valve 28 to allow the pressurized gas to flow into the tire 22. Pressurized gas may be provided for a predetermined period of time that may be associated with an amount of additional tire pressure desired and/or until the tire is inflated to the target tire pressure.

At block 110, the measured or detected tire pressure may be further compared to the target tire pressure to determine whether the tire is overinflated. If the measured tire pressure is greater than the target tire pressure (or greater than the largest value of a target tire pressure range), then the tire may be overinflated and the tire method may continue at block 112. If the measured tire pressure is not greater than target tire pressure, then the tire pressure may be adequately inflated and the method may continue at block 114.

At block 112, the tire may be deflated. The tire may be deflated by providing one or more pressurized gas pulses to the tire 22 via the damped valve 28 as previously described. More specifically, the a pulse of pressurized gas may be provided to open the damped valve 28 and then the exhaust valve 46 may be opened to exhaust pressurized gas from the tire when the damped valve moves from the open position toward the closed position or before the damped valve 28 closes. Each pressurized gas pulse may decrease the volume and/or pressure of the pressurized gas in the tire 22 due to damped closing rate of the damped valve 28. As such, a pulse of pressurized gas that opens the damped valve 28 may increase the volume of pressurized gas in the tire 22 by a first amount while a second amount of pressurized gas that exceeds the first amount may be exhausted from the tire 22 while the damped valve 28 closes and exhausted to the atmosphere via an open exhaust valve 46. As such, the volume of gas in the tire 22 and the associated pressure may be decreased by providing a sufficient number of pressurized gas pulses to the tire. The number of pressurized gas pulses provided may be a fixed or variable amount. For instance, a fixed number of pressurized gas pulses may be provided to decrease the tire pressure, the tire pressure may be rechecked, and an additional number of fixed pulses may be provided if the tire pressure still exceeds the target tire pressure. Alternatively, a number of pulses may be calculated or referenced that is based on the magnitude of the difference between the measured tire pressure and the target tire pressure. Such a calculation or reference may be based on the volume of pressurized gas that is expected to be vented from a tire during an individual pressure pulse and may be based on vehicle development testing. It is also contemplated that a tire may be deflated in response to an operator initiated command or command signal which may omit some or all of blocks 100-108.

At block 114, the tire pressure may be adequate or acceptable since the measured tire pressure is note less than the target tire pressure or target tire pressure range (at block 106) and is not greater than the target tire pressure or target tire pressure range (at block 110).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a tire inflation system comprising:

providing a pulse of a pressurized gas to actuate a damped valve from a closed position to an open position, wherein the damped valve is fluidly connected to a tire;

exhausting pressurized gas from the tire before the damped valve moves to the closed position; and wherein the damped valve moves from the closed position to the open position faster than the damped valve moves from the open position to the closed position.

2. The method of claim 1 wherein pressurized gas is exhausted from the tire when the damped valve moves from the open position toward the closed position.

3. The method of claim 1 wherein pressurized gas is exhausted from the tire through the damped valve and through an exhaust valve.

4. The method of claim 3 wherein an inflation pressure of the tire is measured after opening the damped valve and before opening the exhaust valve.

5. The method of claim 1 wherein an inflation pressure of the tire is measured with a pressure sensor that is disposed outside of the tire after providing the pulse of pressurized gas.

6. The method of claim 1 wherein the pulse of pressurized gas increases a volume of pressurized gas in the tire by a first amount and wherein a second amount of pressurized gas that exceeds the first amount is exhausted from the tire before the damped valve moves to the closed position.

7. The method of claim 1 wherein an inflation pressure of the tire decreases after the pulse of pressurized gas is provided to the tire and pressurized gas is exhausted from the tire by operation of the damped valve.

8. The method of claim 1 wherein pressurized gas is provided from a pressurized gas source to the tire via the damped valve when the damped valve is in the open position.

9. The method of claim 8 further comprising a tire valve that is disposed proximate the tire, wherein the damped valve is disposed between the tire valve and the pressurized gas source.

10. The method of claim 9 wherein the tire valve is held in an open position to permit pressurized gas to pass through the tire valve when the damped valve is in the open position and the closed position.

11. The method of claim 8 wherein providing the pulse of the pressurized gas further comprises opening an inlet valve and an outlet valve that are disposed between the pressurized gas source and the damped valve.

12. The method of claim 11 wherein pressurized gas is exhausted from the tire through an exhaust valve and the exhaust valve is closed when the pulse of pressurized gas is provided.

13. The method of claim 12 wherein the inlet valve is closed before the exhaust valve is opened.

14. The method of claim 13 wherein the exhaust valve is fluidly connected to the outlet valve such that the pressurized gas is exhausted from the tire through the outlet valve and through the exhaust valve.

15. The method of claim 14 wherein the exhaust valve is closed after the damped valve moves to the closed position.

16. The method of claim 1 wherein no valve is disposed between the damped valve and the tire.

17. A tire inflation system comprising:

a pressurized gas source that supplies a pressurized gas and that is configured to be fluidly connected to a tire; and a damped valve that is disposed between the tire and the pressurized gas source, wherein the damped valve moves between a closed position in which pressurized gas is inhibited from flowing through the damped valve and an open position in which pressurized gas is not inhibited from flowing through the damped valve, wherein the damped valve moves from the closed position to the open position faster than the damped valve moves from the open position to the closed position.

18. The tire inflation system of claim 17 wherein the damped valve moves from the closed position to the open position in response to a pulse of pressurized gas.

19. The tire inflation system of claim 18 further comprising an exhaust valve that exhausts pressurized gas from the tire inflation system, wherein the exhaust valve is opened to exhaust pressurized gas from the tire before the damped valve moves to the closed position.

20. The tire inflation system of claim 19 wherein a volume of pressurized gas in the tire decreases after the pulse of pressurized gas is provided to the tire and the pressurized gas is exhausted from the tire by operation of the damped valve and the exhaust valve.

* * * * *